March 15, 1927. 1,621,078
J. A. MITCHELL ET AL
MOISTENER AND SEALER DEVICE
Filed Nov. 7, 1924 4 Sheets-Sheet 1

INVENTORS
JOHN A. MITCHELL.
LAWRENCE J. ZAHN.
BY
A. D. T. Libby
ATTORNEY

March 15, 1927. 1,621,078
J. A. MITCHELL ET AL
MOISTENER AND SEALER DEVICE
Filed Nov. 7, 1924 4 Sheets-Sheet 2
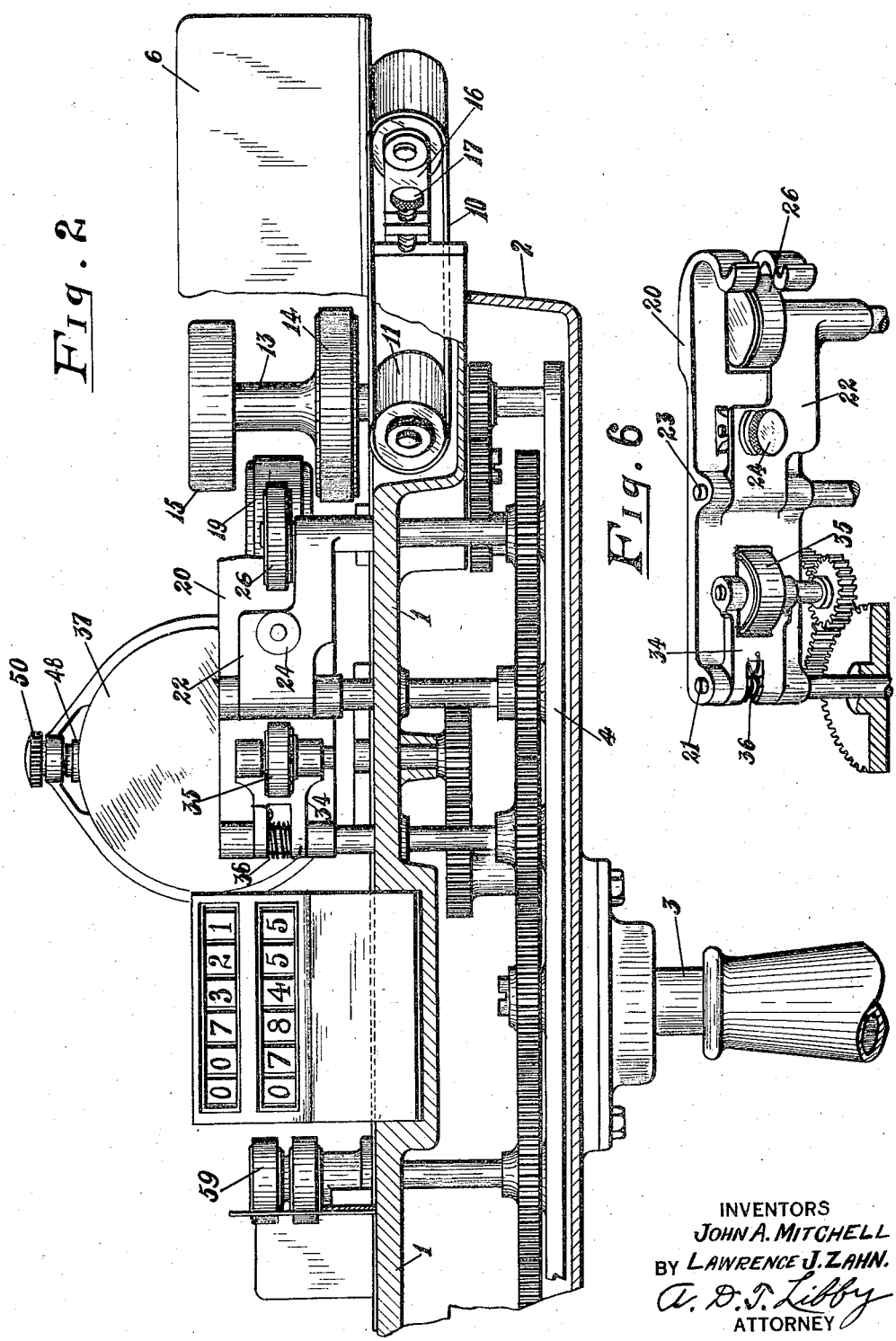
INVENTORS
JOHN A. MITCHELL
BY LAWRENCE J. ZAHN.
ATTORNEY

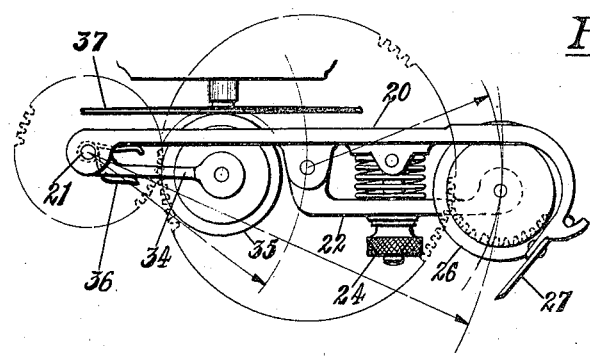
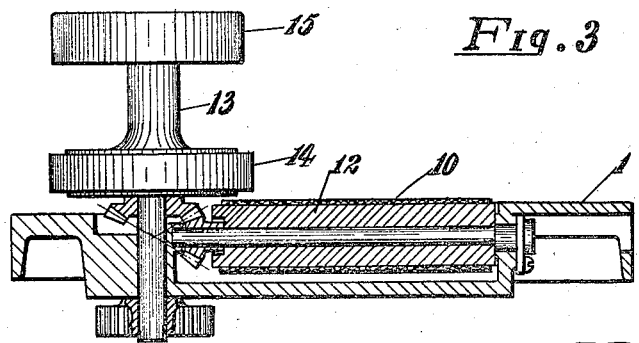
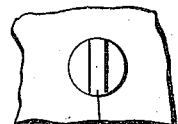
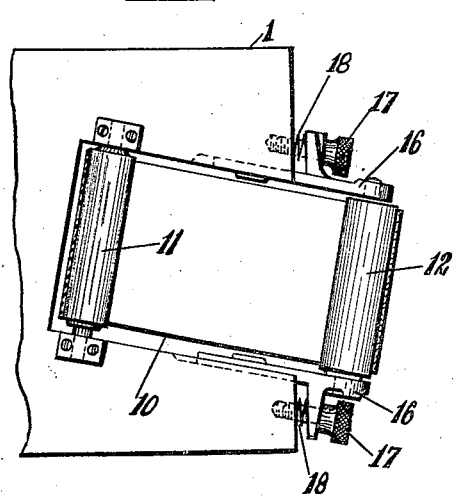
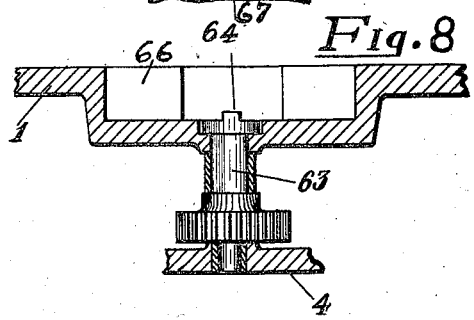

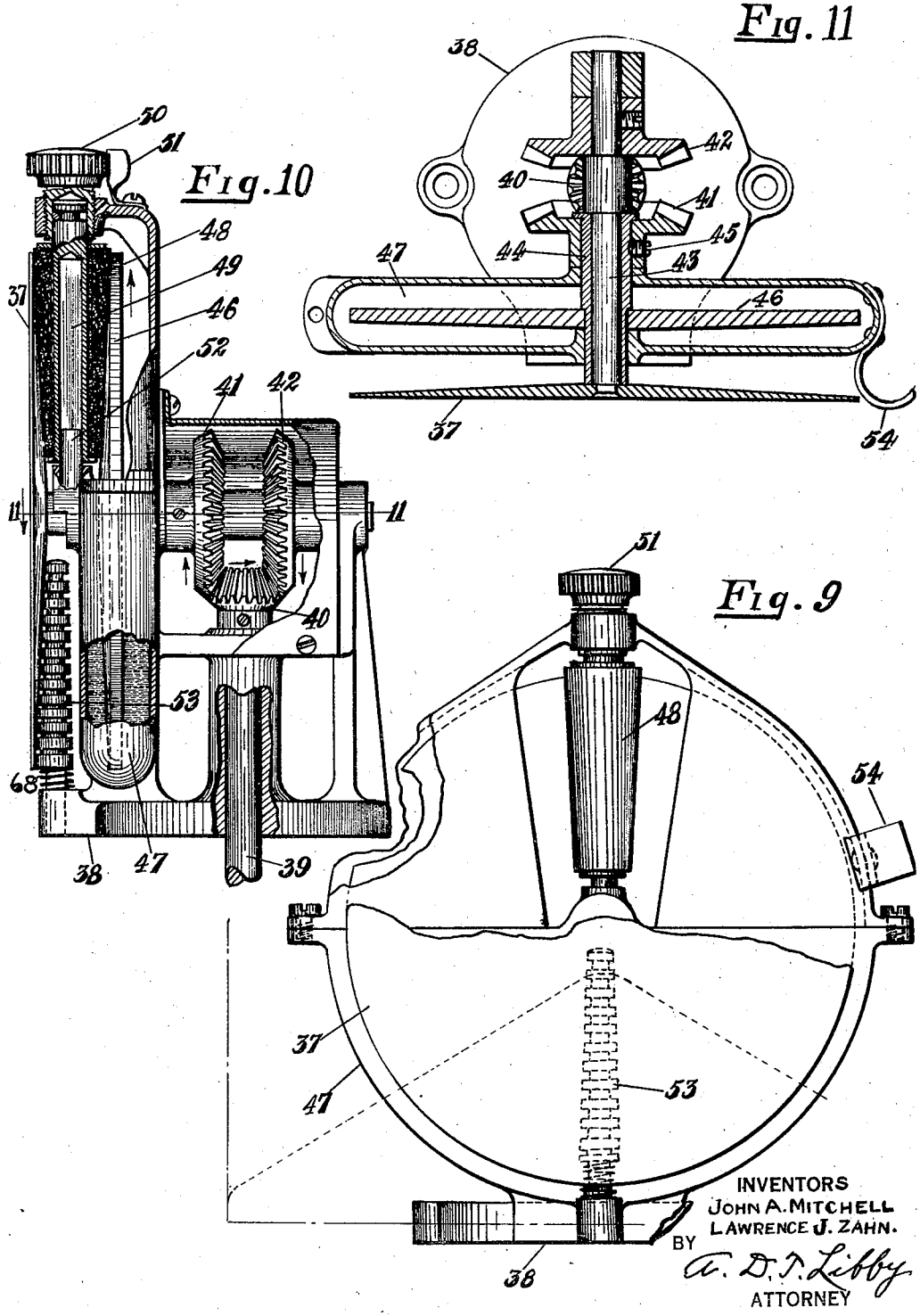

Patented Mar. 15, 1927.                              1,621,078

UNITED STATES PATENT OFFICE.

JOHN A. MITCHELL, OF NEWARK, NEW JERSEY, AND LAWRENCE J. ZAHN, OF LONG ISLAND CITY, NEW YORK, ASSIGNORS TO INTERNATIONAL POSTAL SUPPLY COMPANY, OF BROOKLYN, NEW YORK.

MOISTENER AND SEALER DEVICE.

Application filed November 7, 1924. Serial No. 748,373.

This invention relates to a combination machine for the purpose of taking mail, separating, and sealing same, then applying a post mark thereto and finally metering or registering the number of pieces of mail matter that pass through the machine. A machine of this character is especially adapted for use in large establishments having a big quantity of mail.

It is the principal object of our invention to provide a combination machine which will fulfill the three principal functions outlined above.

In carrying out the principle of our invention it is another object to perform all these functions automatically so that the hand labor is reduced to a minimum.

Another object of our invention is to provide various detailed improvements which will bring about the accomplishment of our principal object in a relative simple, but effective manner.

Another object of our invention is to provide improvements in details which add to the quietness of operation of the machine, and to further provide adjustments for the various parts entering into our improvements which can be readily accomplished.

These and other objects will be apparent to one skilled in this particular art after a study of the specification taken in connection with the annexed drawings, wherein Figure 1 is a plan view of that portion of the machine in which our improvements are incorporated.

Figure 2 is an elevational view on the line 2—2 of Fig. 1, except as to the meter which is shown in a position corresponding to Fig. 1, with a part of the casing removed to show some of the driving mechanism.

Figure 3 is a part elevation and sectional view of the double feed roll and the mail conveyor for bringing the mail up to the feed roll.

Figure 4 is a top view of the belt conveyor shown in Fig. 3, but with the belt cut away.

Figure 5 is a plan view of the separator as shown in Fig. 1.

Figure 6 is a perspective side view of the separator shown in Fig. 5.

Figure 7 is a fragmentary plan view of the driving member shown in Fig. 8.

Figure 8 is a sectional view showing the means for driving the meter or registering device.

Figure 9 is a front elevation of the moistening device.

Figure 10 is a side view of the unitary moistening structure with parts of the casing broken away to show the interior mechanism, while Figure 11 is a horizontal sectional view on the line 11—11 of Fig. 10.

Figure 1:
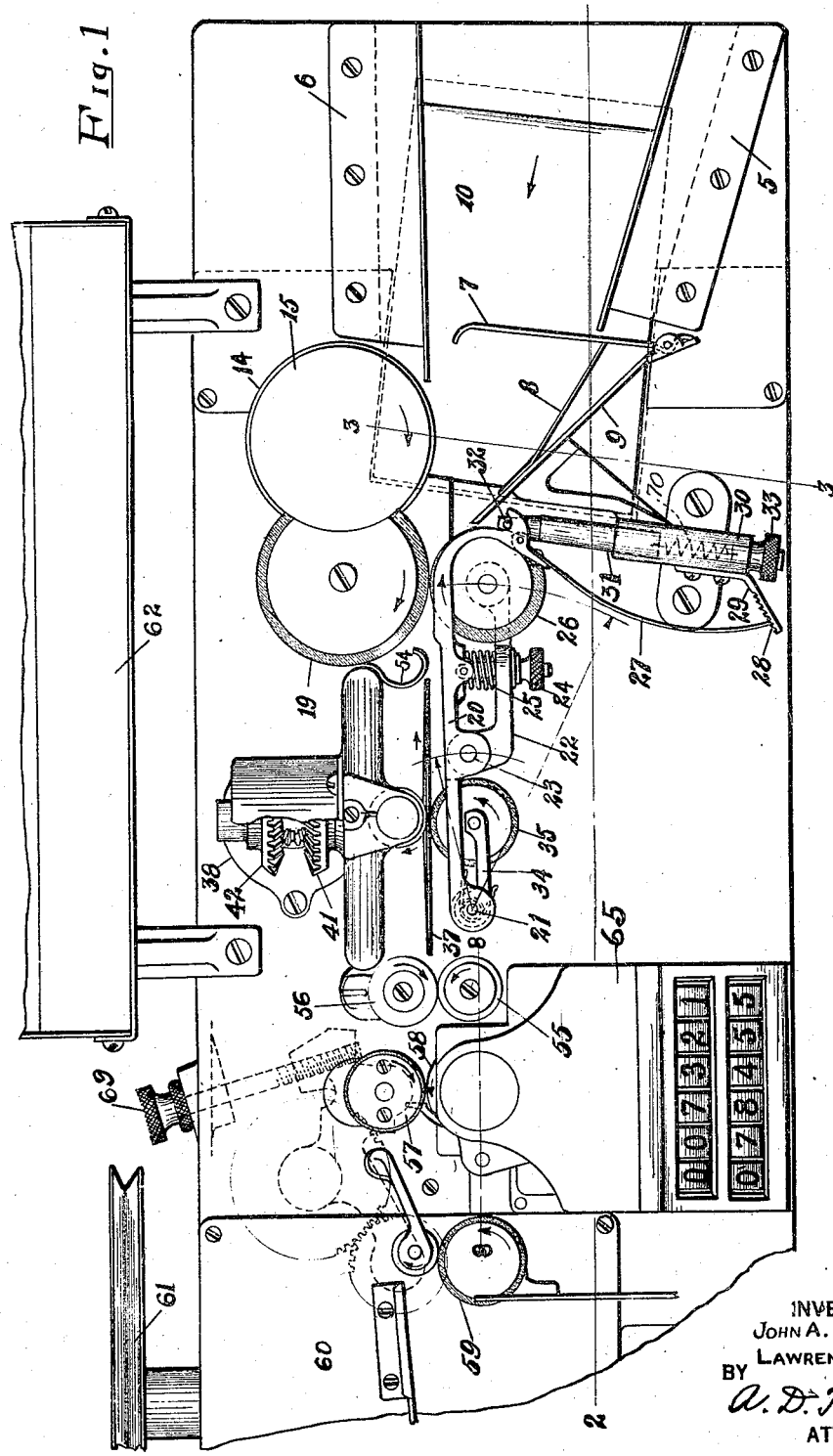

Referring now to details wherein like numbers refer to corresponding parts in the various views, 1 is a table on which the mechanism of the machine is mounted; as will be seen from Fig. 2, the driving mechanism is mounted on the bottom side of the table 1, and consists of a series of gear wheels properly associated to drive the parts which will be hereinafter described. The driving mechanism is enclosed within a casing or gear trough 2 and which is supported on a pedestal 3. 4 is a gear plate which acts as a support or bearing for the bottom end of the gear spindles. On top of the table 1, are fastened two wing members 5 and 6, which constitute a chute for guiding the mail in the machine. When the mail is placed within the chute the feed plate 7 is moved forward in opposition to spring 8 against the guide plate 9 and as the mail decreases in quantity through the chute, the spring 8 pushes the member 7 to the position shown in Fig. 1, for the purpose of keeping the mail matter in proper vertical position. When the machine is in operation, the conveyor belt 10, which is carried on two rollers 11 and 12 automatically carry the mail forward so that it is engaged by the double feed roller 13; the bottom part 14 of which carries a rubber band while the upper part 15 merely acts as a support or guide for the envelopes. The roller 11 is fixed in position as shown in Fig. 4 while the roller 12 is supported on two brackets 16 which are adjustable by means of a thumb nut 17 and spring 18. By this means, proper tension on the conveyor belt 10 may be obtained. It is to be understood that the belt 10 may be of any suitable material such as rubber or leather. As the mail is brought forward, by the double feed roller 13, it is brought into engagement with the feed roll 19, which is turned in the direction of the arrow. In order that but one letter or piece of mail matter shall be passed through at a time, a separator device must be utilized. In our present invention, this separator device takes the form of a lever 20 which is pivoted at 21. The lever 20 carries an arm 22 which is pivoted thereon at 23, said arm 22 being adjustable by a thumb nut 24 co-acting with a spring 25 as is clearly shown in Figs. 1 and 5.

Pivoted on the outer end of the arm 22 is carried a separator roll 26 which is geared to operate in the direction of the arrow, which, it will be noted, is in the opposite direction from the feed roll 19. Attached to the outer end of the lever 20, is a spring 27, which has one end adjustably carried in notches 28 on a bracket 29 preferably mounted on the side of the barrel 30, within which, is housed a spring 70 shown in dotted lines that functions on the plunger 31 so as to draw, through the medium of a pin 32, the end of the lever 20 away from the feed roll 19. This withdrawal movement of the plunger 31, is opposed by the spring 27, adjustment of the plunger being obtained by a thumb nut 33 until the proper balance is obtained. This double adjustment on the end of the lever 20 is for the purpose of accommodating various thickness of envelopes as they pass between the roll 19 and the roll 26, it being understood that the normal adjustment is such that a slight clearance is normally left between these two rolls. Final adjustment of roll 26 is obtained by the adjusting nut 24 as previously referred to. Hinged on the same spindle 21 is an arm 34 carrying a feed roll 35. The arm 34 and the feed roll 35 are positioned between the fork in the lever 20, the roller 35 projecting through this fork. A spring 36 is used to continually force the lever 34 toward the rotary member 37 forming a part of the moistening device which will now be described in detail. The moistening device constitutes a unitary structure made up of a bracket 38 having a driving spindle 39 carried thereby. On the upper end of the driving spindle 39 is a gear 40 which is in mesh with a pair of bevel gears 41 and 42. The gear 42 is connected to a spindle 43 on the outer end of which is mounted the disc 37 already referred to. The spindle 43 has its bearing in and is driven through a sleeve 44. The gear 41 is fastened to the sleeve 44 in any suitable manner as by the set screw 45. Fastened to the sleeve 44 is a disc 46 and the two discs 37 and 46 revolve in opposite directions as will be more clearly seen by reference to Fig. 10 from which it will be further seen that the disc 46 operates within the housing or chamber 47 which contains water that is carried by the disc 46 up to the moistening roller 48. The roller 48 revolves on a hollow spindle 49 and its pressure against the disc 46, as well as the disc 37, is controlled by the adjusting screw 50 which is held in adjustable position by the catch or detent 51. The bottom end of the hollow spindle 49 is guided by the stud 52. The base member 38 also supports a flap pressure roll 53 which is made tapered to conform with the inner contour of the disc 37. The roller 53 is cut away to give a series of spaced contacts in order that all the moisture beneath the flap of the envelope will not be squeezed out as the letters pass through. On the frame of the unitary moistening device is a guide member 54 which extends to a point adjacent the periphery of the disc 37. The guide member 54 engages the bottom of the envelope, it being understood that the letters go through the machine in an up-side-down position, as indicated by the dotted line in Fig. 9, and bends this away from the disc 37 so the face of the envelope passes on the side of the disc 37 toward the separator lever 20 while the flap passes on the reverse side of the disc 37. The pressure roller 53 is resiliently mounted through the medium of a spring 68 so that it may be pushed downward slightly when the envelope flap passes between it and the disc 37. The mail matter is carried forward by the roll 35 with the assistance of the disc 37 after they are moistened in the manner above described, to the pressure rolls 55 and 56, which rolls, it being understood, that 56 is adjustable to seal the letter, which is then passed to the printing pressure roller 57 having an adjustment 69 and the printing die 58, which in the present case, is mounted on, and forms a part of the registering mechanism generally illustrated by 65, from which point the mail is carried to the stacker feed rolls 59 and to the stacker 60.

No complete description of the stamping and registering mechanism will be made herein as this is the subject of a separate application, except to say that the plate 1 has a depression 66 therein to receive the stamping and printing mechanism which is driven by a shaft 63 having a lug 64 thereon to engage a slot 67 in the meter drive shaft (see Figs. 7 and 8).

It may be also mentioned that the machine is operated by a pulley 61 driven by any suitable means such as a small electric motor. A letter tray 62 carries the letters as they are brought to the machine for feeding as has been described.

Mail marking machines, in general, are old, as will be seen by reference to Jahn Patent 856,345 of June 11, 1907, so we have merely confined this specification to the additions and improvements thereto, and, while we have described a preferred form of our feeding, separating, and moistening devices, it will be readily appreciated that in a machine of this character, the details may be varied over a considerable range without departing from the spirit of our invention and the scope of the appended claims.

Having thus described our invention, what we claim is:

1. In a machine of the class described, a separator mechanism including a feed roll, a lever having associated therewith a plurality of rolls one of which cooperates with said feed roll and another acting as a moisture device feed roll, a spring acting to carry said lever toward the first mentioned feed roll and a spring controlled member acting to force the lever away from said feed roll substantially as described.

2. In a machine of the class described, a separator mechanism including a feed roll, a lever having associated therewith a plurality of rolls one of which cooperates with said feed roll and another acting as a moisture device feed roll, an adjustable spring acting to carry said lever toward the first feed roll and an adjustable spring actuated plunger acting on said lever in opposition to said first mentioned spring.

3. In a machine of the class described, a separator mechanism including a feed roll, a lever having associated therewith a plurality of rolls one of which cooperates with said feed roll and another acting as a moisture device feed roll, a spring housing having a plunger extending from one end thereof and into cooperation with said lever, a spring in said housing with means for adjusting the tension of the same, said spring acting to move the lever away from the feed roll and a second adjustable spring having one end positioned on the lever and the other carried by said spring housing as described.

4. In a machine of the class described, a separator mechanism including a feed roll, a lever having a pivoted arm thereon and carrying a roll cooperating with said feed roll to separate the mail matter with means for adjusting the position of said cooperating roll with respect to said feed roll.

5. In a machine of the class described, a separator mechanism including a feed roll, a lever having an arm pivoted thereon and another arm and the lever as a whole having a common pivot, said latter arm carrying a moisture device feed roll while the other arm carries a roll for cooperating with said feed roll to separate the mail matter.

6. In a machine of the class described, a separator mechanism including a feed roll, a lever having an arm pivoted thereon and another arm and the lever as a whole having a common pivot, said latter arm carrying a moisture device feed roll while the other arm carries a roll for cooperating with said feed roll to separate the mail matter, with means for adjusting the latter arm with respect to the lever and means for adjusting the position of the whole lever.

7. In a machine of the class described, a separator mechanism including a feed roll, a lever having a pivoted arm thereon and carrying a roll cooperating with said feed roll to separate the mail matter with means for adjusting the position of said cooperating roll with respect to said feed roll, and a second arm pivoted on the same spindle with said lever and carrying a moisture device feed roll, said second arm being spring actuated so the moisture device roll will maintain its working position for all positions of adjustments of said lever.

8. In a machine of the class described, a moistening device having a rotary member, a separator mechanism including a lever adjacent and substantially parallel to the plane of said rotary member, said lever having an arm carrying a roll acting to assist in feeding the mail matter through the machine and a second arm having a common pivot with said lever and having a roll in normal engagement with said rotary member.

9. In a machine of the class described, a moistening device having a rotary member, a separator mechanism including a lever adjacent and substantially parallel to the plane of said rotary member, said lever having an arm carrying a roll acting to assist in feeding the mail matter through the machine and a second arm carrying a roll extending through a fork in said lever and into engagement with said rotary member.

10. In a machine of the class described, a moistening device having a rotary member, and a fixed guide member extending to a point near the periphery of said rotary member, a separator mechanism including an adjustable lever lying adjacent said rotary member, said lever carrying a roll acting to assist in feeding the mail matter through the machine and another roll pivoted on a spring actuated arm and extending through said lever into normal engagement with said rotary member.

11. In a machine of the class described, a moistening device having a rotary member, and a guide member for causing the flap of the envelope to pass on one side of said rotary member while the envelope passes on the other side and a separator mechanism including a roll for moving the envelope past said rotary member as and for the purpose described.

12. In a machine of the class described, a separator mechanism including a feed roll, and a lever carrying a separator roll closely adjacent the feed roll with means for adjusting the position of the separator roll and further means for rotating it in a direction opposite to said feed roll.

13. In a machine of the class described, a separator mechanism including a feed roll, a lever pivoted at one end and lying in a direction substantially parallel to the direction of movement of the mail through the machine, said lever having an adjustable arm, a roll carried by said arm closely adjacent said feed roll but actuated in an opposite direction thereto.

14. In a machine of the class described, means for separating and sealing envelopes including; a feed roll and a separator roll running in reverse direction to the feed roll, an adjustable lever carrying said separator roll, a rotary disc positioned adjacent the lever, a guide member positioned at the periphery of the disc to engage the envelope as it comes from the feed roll to cause the envelope to pass on that side of the disc toward said lever while the flap passes on the opposite side of the disc and a roll extending through an opening in said lever into engagement with said disc for the purpose described.

15. In a machine of the class described, means for moistening envelope flaps preparatory to sealing comprising a unitary structure consisting of; a pair of rotatable discs with a moisture roller positioned there between, a pressure roller engaging one of said discs, one of said discs having a part at least positioned in a liquid and the other disc positioned to receive the envelopes from a separator and means cooperating with the latter disc to cause the flap of the envelope to move on one side of the disc to be engaged by the pressure roll and the body of the envelope on the other, with means for moving the envelopes past said disc to sealing rolls as described.

16. In a machine of the class described, means for moistening envelope flaps preparatory to sealing comprising a unitary structure consisting of; a pair of discs rotatable in opposite directions, an adjustable moisture roller contacting with both discs, one of said discs having a part passing through a liquid while the other disc has an adjustable pressure roller contacting therewith, and means cooperating with the latter disc to cause the flap of the envelope to move on one side of the disc to be engaged by the pressure roll and the body of the envelope on the other, with means for moving the envelope past said disc to sealing rolls as described.

17. A moistening device for a machine of the class described, comprising a unitary structure adapted to be mounted on said machine, said structure including; a support, a pair of discs spaced apart, driving means for the discs carried by the support, one of said discs being substantially enclosed by a casing carrying in the bottom thereof a liquid, an absorption wiper roller rotatably positioned between and contacting with both discs, a pressure roller engaging the face of the other disc and an envelope guide member preferably fastened to said casing to cause the flap of a passing envelope to pass between the pressure roller and its cooperating disc.

18. A moistening device for a machine of the class described, comprising a unitary structure adapted to be mounted on said machine, said structure including; a support, a pair of discs spaced apart, driving means for the discs carried by the support, one of said discs being substantially enclosed by a casing, carrying in the bottom thereof a liquid, an absorption wiper roller rotatably and adjustably positioned between and contacting with both discs, a tapered pressure roller resiliently mounted to contact with a taper face of the other disc and means carried by the structure for causing the flap of a passing envelope to pass between the pressure roller and its cooperating disc.

19. A moistening device for a machine of the class described, comprising a unitary structure adapted to be mounted on said machine, said structure including; a support, a housing carried by the support and adapted to carry a liquid in the bottom part, a disc rotatably mounted within said housing and dipping into said liquid, an absorption roller carried by said housing so as to rotate with said disc, said roller protruding through an opening in said housing, a second disc without the housing and mounted to be rotated in contact with said roller and a pressure roller engaging the mail passing the second disc for the purpose described.

20. A moistening device for a machine of the class described, comprising a unitary structure adapted to be mounted on said machine, said structure including; a support, a housing carried by the support and adapted to carry a liquid in the bottom part, a disc rotatably mounted within said housing and dipping into said liquid, an absorption roller carried by said housing so as to rotate with said disc, said roller protruding through an opening in said housing, a second disc without the housing and rotatably carried by the driving spindle for the first disc, said roller being adjustable for ensuring contact with both discs and a resiliently mounted pressure roller contacting with the same face of the second disc as said absorption roller.

21. A moistening device for a machine of the class described, comprising a unitary structure adapted to be mounted on said machine, said structure including; a support, a housing carried by the support and adapted to carry a liquid in the bottom part, a disc rotatably mounted within said housing and dipping into said liquid, an absorption roller carried by said housing so as to rotate with said disc, said roller protruding through an opening in said housing, a second disc without the housing and mounted to be rotated in contact with said roller and a tapered roller having relieved portions along its length, the full portions engaging the mail passing said second disc for the purpose described.

22. A moistening device for a machine of the class described, comprising a unitary structure adapted to be mounted on said machine, said structure including; a support, a pair of vertically mounted discs with means for driving them, one of said discs adapted to have its outer face placed in contact with a separator feed roll, the other disc being mounted to pass through a liquid as it is rotated, a wiper for picking up the liquid from the last mentioned disc and transferring at least a part thereof to the first disc, means for causing the flap of an envelope to pass over the moistened surface of said first disc and a pressure roller for engaging the flap as described.

23. A moistening device for a machine of the class described, comprising a unitary structure adapted to be mounted on said machine, said structure including; a support, a pair of vertically mounted discs with means for driving them, in reverse direction, a wiper roller adjustably mounted and a pressure roller resiliently mounted between said discs and preferably diametrically opposite each other, the wiper roller being in contact with both discs while the pressure roller contacts with only one disc, one of said discs being mounted to pass through a liquid as it is rotated, and means for causing the flap of an envelope to pass on that side of the disc which is in engagement with both of said rollers as and for the purpose described.

24. A moistening device for a machine of the class described including a rotatable disc placed adjacent a separator device and in contact with a separator feed roll, means for guiding an envelope so the flap thereof will pass on that side of the disc away from the separator feed roll, a second rotatable disc for picking up moisture, means for transferring at least a part of the moisture to one face of said first disc and a device for pressing the flap of the envelope against the moistened surface of the first mentioned disc.

25. A moistening device for a machine of the class described, including a rotatable disc placed adjacent a separator device and in contact with a separator feed roll, means for guiding an envelope so the flap thereof will pass on that side of the disc away from the separator feed roll, a second rotatable disc for picking up moisture, adjustable means engaging both discs for transferring at least a part of the moisture to one face of said first disc, means for driving said discs in reverse direction and a pressure roller for engaging the flap of the envelope at spaced points to ensure that a sufficient quantity of moisture stays on the flap as it passes over the face of the disc.

26. A moistening device for a machine of the class described, including two rotatable discs, one disc having means associated therewith to cause the flap of an envelope to wipe across one surface thereof and the other disc having associated means for picking up and transferring moisture to the flap engaging surfaces of the first disc.

In testimony whereof, we affix our signatures.

JOHN A. MITCHELL.
LAWRENCE J. ZAHN.